(No Model.) 2 Sheets—Sheet 1.

J. W. MOORE.
PIPE COUPLING.

No. 451,565. Patented May 5, 1891.

WITNESSES
William A. Sweet
Charles I. Brintnall

INVENTOR
John W. Moore
by W E Hagan atty (No Model.) 2 Sheets—Sheet 2.

J. W. MOORE.
PIPE COUPLING.

No. 451,565. Patented May 5, 1891.

WITNESSES
William A. Swert
Charles S. Brintnall

INVENTOR
John W. Moore
by W. E. Hagan
Atty

UNITED STATES PATENT OFFICE.

JOHN W. MOORE, OF LANSINGBURG, ASSIGNOR OF ONE-HALF TO ZEPH. F. MAGILL, OF TROY, NEW YORK.

PIPE-COUPLING.

SPECIFICATION forming part of Letters Patent No. 451,565, dated May 5, 1891.

Application filed December 14, 1889. Serial No. 333,738. (No model.)

*To all whom it may concern:*

Be it known that I, JOHN W. MOORE, of the village of Lansingburg, county of Rensselaer, State of New York, have invented new and useful Improvements in Couplings for Hose and Steam Pipe Connections, of which the following is a specification.

My invention relates to improvements upon that class of couplings which are used to connect hose and also the steam-pipes employed for heating the cars of railway-trains; and the purpose and object of my invention is to construct each of the coupler parts oppositely alike, and so that one will connect with the other without using an intermediate short pipe.

Accompanying this specification to form a part of it there are two plates of drawings containing eight figures illustrating my invention, with the same designation of parts by letter-reference used in all of them.

Figure 1:
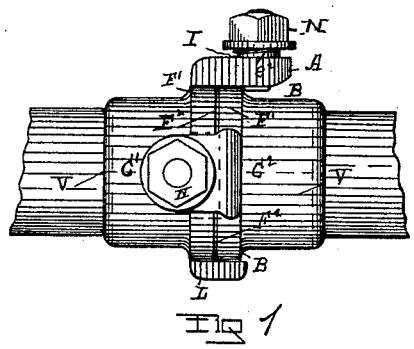
Figure 2:
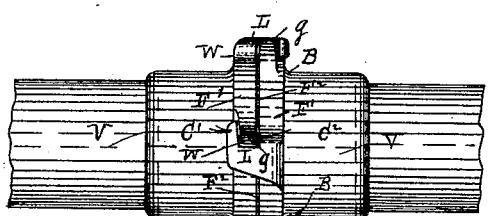
Figures 4, 6:
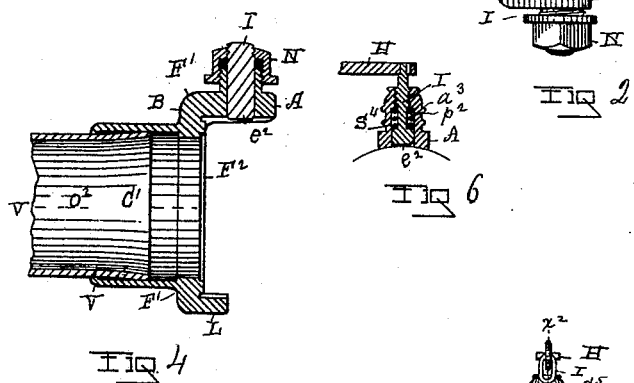
Figure 3:
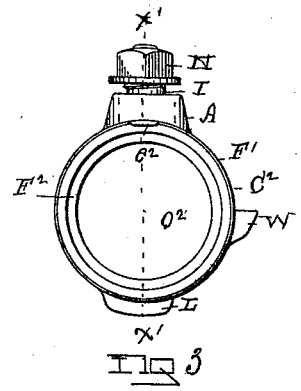
Figure 5:
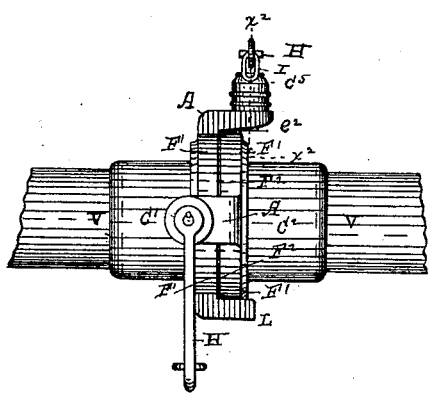
Figure 8:
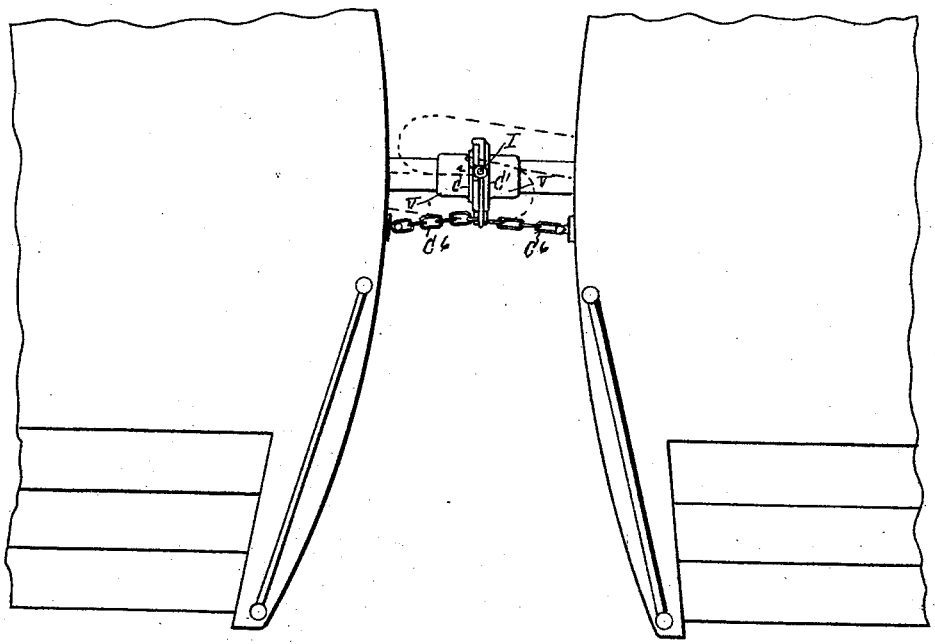
Figure 7:
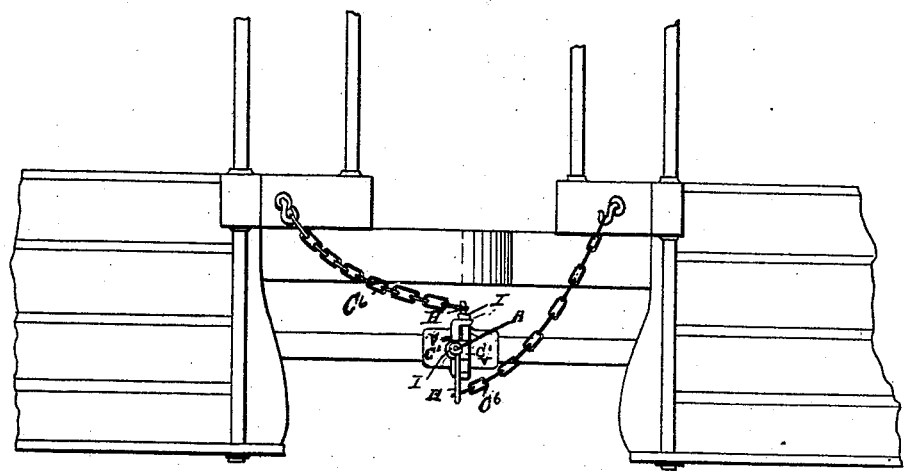

In the illustrations, Figure 1 is a side elevation of my improved coupler with the parts shown as connected with one of the clamping-lips and catches of each coupler parts shown as connected with the opposite clamping-lip and catch part of the other, and with each of the screw-bolts arranged oppositely in subtending or overlapping arms upon each of the coupler parts also shown. Fig. 2 is another side elevation of the parts illustrated in elevation at Fig. 1, with the clamping-lips and catches connecting the two coupler parts, said figure illustrating also one of the screw-bolts. Fig. 3 is an end elevation of one of the coupler parts with its bearing or packing face turned facing the view. Fig. 4 is a cross-section of one of the coupler parts, taken through one of the clamp-lips, one of the arms, nuts, and bolts, and pipe or hose, on the line $x'\ x'$ of Fig. 3. Fig. 5 shows the same parts that are shown at Fig. 1, but with a modified means for operating the screw-bolts to adapt my invention to connect the steam-heating pipes of a railway-train. Fig. 6 is a section taken on the line $x^2\ x^2$ of Fig. 5. Fig. 7 is a side elevation of the modification shown at Figs. 5 and 6 as applied to connect the steam-heating pipes of two cars. Fig. 8 is a top view of the apparatus shown at Fig. 7.

The several parts of the apparatus thus illustrated are designated by letter-reference, and the function of the parts is described as follows:

The letters $C'$ and $C^2$ designate the coupler parts, each of which is oppositely made with a central passage $O^2$, and each of them made with a flange $F'$, encircling said passage, a tail-piece V, and a beveled surface B on the outside of said flange where joining the tail-piece. Each of these coupler parts is made with a face $F^2$, containing packing adapted to make a steam and water tight joint when these faces of the two coupler parts are brought together in abutting contact and secured in such position.

The letter W designates wedge-form catches that are projected radially from the outer surfaces of the flanges $F'$ of each coupler part, and the letters L designate lips that are also projected therefrom, which lips of each coupler part are made to overlap the flange-rim of the other coupler part where the two are brought together for connection, and each of these lips is made with a slot $g$ on its side where facing the catch part of the other coupler part. When the coupler parts as thus constructed are brought together with their packing-faces in contact and are slightly rotated, so that the lips will approach the wedge-form catches W, the latter will enter the slots of the lips to tongue therein, while the wedging-surfaces of the catches will engage with the sides of the slots in the lips to draw and clamp the coupler parts together, as shown at Fig. 2.

The letter A designates an arm, which is projected from the flange $F'$ upon each coupler part, and extended laterally, so as to be in line with the central passage $O^2$, and so as to overlap and subtend the rim of the flange $F'$ of the other coupler part when the two latter are brought face to face, as before described.

The letter I designates a screw-bolt that is threaded into the arm A of each coupler part, and N a nut arranged on said bolt. When said bolt is screwed down in said arm, the lower end $e^2$ thereof engages with the bevel B of each of the coupler parts and secures them as clamped by the lips and catches, as before described. The threads which operate the bolts I by means of the nuts N are preferably quick-threads and so constructed that a quarter-turn of the nuts will raise the bolt I from out of its engagement with the bevel B, or a quarter-turn in an opposite direction will cause it to engage therewith.

The letter $p^2$ designates a chamber made in the outward extension of each of the arms A, and $S^4$ a spiral spring arranged therein to encircle the bolt I between its boss end $e^2$ of said bolt and the top $a^3$ of the said chamber, so that said bolt is raised against the face of said spring. The function of this spring is to enable a quick thread to be used to operate the bolt I, and to hold the latter down in engagement with the bevel B, so that the vibration or jars of a moving train will not throw it out of engagement. If desired, by using a slower thread on the bolt I and nuts N the spring $S^4$ may be omitted.

In the modification shown at Figs. 5, 6, 7, and 8, instead of the nut N, a lever-handle II is on its inner end connected to the bolt I of each coupler part, and a chain $C^6$ connects the outer end of this lever-handle with the adjacent end of a railway-car. As thus made and arranged, the abutting faces of each of the coupler parts where having packing may be brought together so as to abut, and by slightly rotating them oppositely they are drawn closely together so as to be held in a steam or water tight connection by the operation of the screw-bolts.

I am aware that a screw-bolt operated to engage with the beveled face of coupler parts to cause them to engage is not new, broadly considered, and I disclaim the same apart from the improved manner in which I construct the parts to use such factors, and this improved construction of the latter in combination with the other factors which I illustrate and describe.

Having thus described my invention, what I claim, and desire to secure by Letters Patent, is—

1. The combination of the coupler parts C' and $C^2$, each made with a tail-piece V, a central passage-way $O^2$, a packing-face $F^2$, a flange F', having a bevel B, a wedge-form catch W, a lip L, having the slot $g$, and an arm A, having arranged therein the threaded bolt I, provided with a nut N, constructed and arranged to operate substantially in the manner as and for the purposes set forth.

2. The combination of the coupler parts C' and $C^2$, each made with the tail-piece V, a central passage $O^2$, a packing $F^2$, a flange F', having a bevel B, a wedge-form catch W, a lip L, having a slot $g$, and an arm A, constructed with the threaded bolt I, having the encircling spring $S^4$ and handle II and arranged to operate substantially in the manner as and for the purposes set forth.

Signed at Troy, New York, this 2d day of October, 1889, and in the presence of the two witnesses whose names are hereto written.

JOHN W. MOORE.

Witnesses:
CHARLES S. BRINTNALL,
W. E. HAGAN.